United States Patent [19]
Baumanis et al.

[11] Patent Number: 5,942,582
[45] Date of Patent: Aug. 24, 1999

[54] TREATMENT OF ORGANIC COMPOUNDS TO REDUCE CHLORINE LEVEL

[75] Inventors: Charles K. Baumanis, Chardon; Marvin M. Maynard, Concord; Alan C. Clark, Mentor; Matthew R. Sivik, Parma; Clifford P. Kowall, South Euclid; David L. Westfall, Lakewood, all of Ohio

[73] Assignee: The Lubrizol Corporation, Wickliffe, Ohio

[21] Appl. No.: 08/895,978

[22] Filed: Jul. 17, 1997

Related U.S. Application Data

[62] Division of application No. 08/804,759, Feb. 24, 1997, Pat. No. 5,708,097, which is a continuation of application No. 08/322,831, Oct. 18, 1994, abandoned, which is a continuation-in-part of application No. 08/188,004, Jan. 28, 1994, abandoned.

[51] Int. Cl.$^6$ ................................. C08F 8/22; C08F 8/32; C08F 8/14

[52] U.S. Cl. ........................ 525/356; 525/327.4; 525/355; 525/359.1; 525/379; 525/384; 528/483; 528/490; 528/491

[58] Field of Search .................................... 525/355, 356, 525/359.1, 327.4, 379, 384; 528/490, 491, 483; 585/801

[56] References Cited

U.S. PATENT DOCUMENTS 4,234,435  11/1980  Meinhardt ............................... 508/192

*Primary Examiner*—Fred Zitomer
*Attorney, Agent, or Firm*—Beverly A. Pawlikowski; David M. Shold

[57] ABSTRACT

The present invention describes a process for reducing the chlorine content of various organochlorine compounds including the step introducing a source of iodine or bromine and mixtures thereof to the organochlorine compound.

20 Claims, No Drawings

5,942,582

TREATMENT OF ORGANIC COMPOUNDS TO REDUCE CHLORINE LEVEL

This is a divisional of application Ser. No. 08/804,759 filed Feb. 24, 1997, U.S. Pat. No. 5,708,097 which is a continuation of Ser. No. 08/322,831 filed Oct. 18, 1994, now abandoned which a CIP of Ser. No. 08/188,004 filed Jan. 28, 1994, now abandoned.

FIELD OF THE INVENTION

This invention deals with the treatment of various organic compounds to reduce the level of chlorine in the organic compound. The invention has particular utility in preparing compounds for the lubricant industry.

BACKGROUND OF THE INVENTION

For many years chlorine has been used to facilitate the processing of various organic compounds to obtain a variety of useful products. Organic compounds whether intentionally incorporating chlorine or by carrying a chlorine containing by-product may generate hydrochloric acid upon burning.

Among various halogenated products which are now restricted for production or which are being eliminated include materials such as chlorinated biphenyl, dioxin, and various ozone depleting materials such as chlorofluorocarbons propellants. More innocuous sources of organochlorine include products utilized as dispersants in motor oils. A dispersant is a compound which aids in keeping sludge from accumulating on engine parts. Due to environmental concerns, particularly in Europe, it has become desirable to eliminate or reduce the level of chlorine in products no matter how small the amount of the chlorine initially.

One potential solution to eliminating chlorine containing compounds is simply not to prepare any compounds in which the chlorine is an ingredient or which form a chlorinated by-product. The impracticalities of eliminating the production of all chlorine containing compounds worldwide should be readily apparent given the large amount of chemical production dependent upon the use of chlorine. Products which contain only small amounts of organochlorine and in which the chlorine does not impart a desired property to the composition may be treated to remove the chlorine. Such a process would have to be one which did not cause damage to the desired end product. Chlorine is in any event a desirable reactant in the chemical industry and is often utilized to promote or cause a faster reaction to give the desired end product.

Thus the present invention deals with methods of treating the organic chlorine containing compounds to reduce the chlorine content to acceptably low levels. The process may be modified such that the desired composition only contains a minor amount of organic chlorine and that the overall product's essential characteristics are not changed. In those products where the chlorine content is relatively high, the process is conducted to convert the underlying organic substrate to a relatively low chlorine content by-product.

The Finkelstein substitution was first described in *Ber.* 43,1528 (1910). Organic iodide compounds were obtained from the chlorides or bromides by treatment with sodium or potassium iodide in acetone solution. It was noted by Finkelstein that primary alkyl halides were the most reactive compounds and the tertiary were the least reactive. It was further observed that the treatment of 1,2-dihalides yields ethylenic derivatives. For further information on the Finkelstein substitution see *The Merck Index An Encyclopedia of Chemicals and Drugs,* 8th Edition, 1968.

U.S. Pat. No. 3,975,271 issued Aug. 17, 1976 to Saunier et al teaches water disinfection or sterilization is stated to be typically conducted with sodium hypochlorite. A difficulty noted by Saunier et al is that chlorine treatment alone often is ineffective due to the chlorine being tied up in the form of chloramines. Saunier, et al suggest that bromine and/or iodine may be helpful in treating water supplies.

Ross et al, in U.S. Pat. No. 4,049,382, issued Sep. 20, 1977 discuss a method for monitoring total residual chlorine in solution. The process of Ross is described as mixing a sample stream with a reagent stream containing a disassociated complex of alkali metal ion and iodide ion as well as an excess amount of iodide ion. The process is stated to take place such that iodide ion reacts with all residual chlorine in the sample stream and is converted to iodine. The activity of the iodine is then measured in the resultant stream with a first and second electrochemical potentiometric electrode.

The manufacture of various lubricating oil components is discussed in U.S. Pat. No. 3,231,587 issued Jan. 25, 1966 to Rense. Similar disclosures are found in U.S. Pat. No. 3,215,707 to Rense which issued on Nov. 2, 1965. The Rense patents generally discuss a process utilizing chlorine to obtain the reaction between a long chain hydrocarbon and maleic anhydride or maleic acid.

More recently, disclosures concerning the production of organo substituted maleic anhydride are found in U.S. Pat. No. 4,234,435 issued Nov. 18, 1980 to Meinhardt et al.

It is not believed that the foregoing publications are necessarily relevant to the present invention, however, they do indicate the state of the art concerning reactions of iodine, chlorine and various organic materials. Thus to the extent that any of the references cited herein are relevant to the present invention, they are incorporated herein by reference.

Measurements herein are understood to be approximate. Thus the word "about" may be introduced prior to any such measurement in the specification and claims. Ranges and ratios may be combined to further describe the invention. Temperatures given herein are in degrees Celsius, percentages are by weight, and pressures are in KPa gauge unless otherwise indicated. Where bromine or iodine is expressed to chlorine herein the ratio is in equivalents, e.g. I to Cl.

It is understood that the chlorine is chemically incorporated in an organic compound (hereafter organochlorine compound or chlorine-containing organic compound), and the bromine or iodine is in any form capable of generating elemental iodine, hydrogen iodide, bromine or hydrogen bromide.

The invention is particularly useful for lowering the chlorine content of chlorinated polymers. Without wishing to be bound by any theory, the invention is useful in treating chlorinated compounds such as polyisobutylene where the potential exists for the chlorine to be located on hindered secondary carbons or on neo primary carbons (a primary carbon bonded to a quaternary carbon). It is understood that when referring to polyisobutylene that the "pure" hydrocarbon and chlorinated polyisobutylene are used interchangeably and when only the chlorinated form is meant that the term polyisobutenylchloride is used. Similarly, when referring to polyisobutenylsuccinic anhydride, the "pure" anhydride and chlorinated polyisobutenylsuccinic anhydride are included, and when only the chlorinated form is intended, the term chlorinated polyisobutenylsuccinic anhydride is used.

SUMMARY OF THE INVENTION

The present invention describes a process for reducing the chlorine content of an organochlorine compound comprising: introducing to the organochlorine compound a source of iodine or bromine and contacting the resultant mixture for a sufficient amount of time to reduce the chlorine content of the organochlorine compound without substantially incorporating iodine or bromine in the organochlorine compound.

Also described herein is the process for reducing the chlorine content of a polyalkenylsuccinic anhydride composition such as polypropenylsuccinic anhydride or polyisobutenylsuccinic anhydride comprising: contacting the polyalkenylsuccinic anhydride composition with a source of iodine or bromine for a sufficient amount of time to reduce the chlorine content of the polyalkenylsuccinic anhydride composition.

The invention herein also describes a process for reducing the chlorine content of a polyisobutenylsuccinic anhydride composition comprising: (a) contacting the polyisobutenylsuccinic anhydride having a Mn value of 1,300 to 5,000, an Mw/Mn value of 1.5 to 4.0, and within the polyisobutenylsuccinic anhydride at least 1.3 anhydride groups for each equivalent weight of the groups derived from a polyisobutenyl precursor of the polyisobutenylsuccinic anhydride with, (b) a source of iodine, to form a mixture of (a) and (b); wherein the contacting is conducted between 15° C. and 240° C. and blowing the mixture with a gas, and provided further that the iodine to chlorine equivalent ratio from the chlorine in the polyisobutenylsuccinic anhydride is about $1 \times 10^{-5}$:1 to 10:1.

The invention herein also describes a product made by reducing the chlorine content of a polyisobutenylsuccinic anhydride composition comprising: (a) contacting the polyisobutenylsuccinic anhydride having a Mn value of 1,300 to 5,000 and an Mw/Mn value of 1.5 to 4.0 and within the polyisobutenylsuccinic anhydride at least 1.3 anhydride groups for each equivalent weight of the groups derived from a polyisobutenyl precursor with, (b) a source of iodine, to form a mixture of (a) and (b); wherein the contacting is conducted between 15° C. and 240° C. and blowing the mixture with a gas and provided further that the iodine to chlorine equivalent ratio from the chlorine in the polyisobutenylsuccinic anhydride is about $1 \times 10^{-5}$:1 to 10:1: and, (c) thereafter reacting the resultant polyisobutenylsuccinic anhydride with a polyamine or polyol.

A process for reducing the chlorine content of an initial mixture comprising polyisobutylene and polyisobutylene succinic anhydride comprising introducing to the initial mixture a source of iodine or bromine and contacting the resultant mixture for a sufficient amount of time to reduce the chlorine content of the initial mixture; or reacting the resultant polyisobutenylsuccinic anhydride with a polyamine.

The invention further describes a process for reducing the chlorine content of the reaction product of polyisobutylene and maleic anhydride where the reaction product contains 0.05 to 2 percent of chlorine by weight comprising introducing to the reaction product a source of iodine or bromine and contacting the resultant mixture for a sufficient amount of time to reduce the chlorine content of the reaction product to from 0.001 to 0.2 percent by weight of the reaction product.

The invention further describes a process for reducing the chlorine content of an organochlorine compound comprising: introducing to the organochlorine compound a source of iodine or bromine and contacting the resultant mixture for a sufficient amount of time to reduce the chlorine content of the organochlorine compound and removing the chlorine as a gas or a liquid.

The invention also describes a product and process for reducing the chlorine content of an organochlorine compound comprising: introducing to the organochlorine compound a source of iodine, hydrogen iodide, bromine, or hydrogen bromide and mixtures thereof and contacting the resultant mixture for a sufficient amount of time to reduce the chlorine content of the organochlorine compound.

The invention also relates to a process for reducing the chlorine content of one organochlorine compound utilizing, as the source of bromine or iodine, the effluent recovered from the same or a different process wherein another organochlorine compound is treated with a source of iodine or bromine, preferably elemental iodine or elemental bromine.

DETAILED DESCRIPTION OF THE INVENTION

The present invention as previously noted deals with treating organochlorine compounds so as to reduce the chlorine content.

The materials utilized to treat the organochlorine containing compound are conveniently referred to as a source of iodine or a source of bromine. The source of iodine or bromine may thus be the elemental forms of those materials, preferably iodine. Other additional sources of the source of iodine or bromine are the respective hydrogen iodide or hydrogen bromide. Other forms of the source of iodine may include materials such as $I_3^-$, $I^-$, $I_2Cl^-$, $ICl$, $I^+$, or $IO^-$; or an organic iodide (preferably alkyl) such as t-butyl iodide; or iodide salt. Sources of bromine include bromine, and materials analogous to the iodide sources. It is preferred in most situations to avoid the use of a salt as such must then be removed or left in the product typically as non-functional residue. Where a salt is employed it is preferred that it be the sodium, lithium, potassium, calcium or magnesium salt.

Uniquely, the use of the source of iodine or bromine liberates the chlorine but does not appreciably incorporate bromine or iodine into the organochlorine compound. It is noted herein that the term organochlorine compound refers to the starting compound and in the appropriate context to the compound so treated according to the present invention.

The chlorine content of the starting material may be at any level with the desired reduction by the present invention to an appreciably lower level in the treated organochlorine compound. The chlorine content of the treated organochlorine compound is conveniently reduced to less than 10%, preferably less than 5%, more preferably from 0.001% to 1.0%, and especially preferably less than 0.5% by weight. For example, where the chlorine content of an initial mixture of polyisobutylene and polyisobutylene succinic anhydride is from 0.05 to 2% by weight, the chlorine content of the resultant mixture (treated according to the invention) may be from 0.001 to 0.2 percent by weight. Typically, the amount of the iodine or bromine incorporated into the organochlorine compound will be less than 40%, more preferably less than 1% to 20% by weight of the chlorine removed from the organochlorine product.

It is noted that varying the source of the iodine or the bromine is not particularly important in the present invention in as much as the iodine or bromine source may be converted to another form during the dechlorination process. Thus the source of iodine or bromine is a material which will generate one or more of iodine, bromine, hydrogen iodide, or hydrogen bromide.

The amount of the source of iodine or bromine employed is generally controlled by one or more conditions. Typically, the higher the level of the source of iodine or bromine employed the faster and more efficiently the process will proceed to reduce the chlorine content of the organochlorine compound. The process appears to be one which functions catalytically, that is, the iodine or bromine is typically not substantially incorporated into the organochlorine compound. Thus the amount of the source of iodine or bromine may be reduced to fairly low levels provided that sufficient time is available to treat the organochlorine containing compound.

The reaction time is generally whatever time is required to achieve the desired dechlorination of the organochlorine compound. The reaction may be accelerated by the application of mechanical (stirring) and heat energy provided that any desired product is not decomposed by the reaction conditions.

When typically dealing with the organochlorine compound, the amount of the source of iodine or bromine (on an equivalent basis as iodine or bromine) is conveniently from $1\times10^{-5}$:1 to 10:1 to the equivalents of chlorine chemically bound (covalently) in the organochlorine compound. Typically, the equivalent ratio will be from $1\times10^{-3}$:1 to 5:1; preferably from $1\times10^{-2}$:1 to 2:1. It is also possible to utilize a mixture of a source of iodine and a source of bromine. It has not been particularly noted to be any more advantageous to utilize a mixture of the source of iodine and bromine than to utilize the source of iodine and source of bromine separately. However, where it is desired to particularly utilize a mixture of the source of iodine and the source of bromine, it is suggested that they be utilized in a equivalent ratio of from 10:1 to 1:10, preferably 5:1 to 1:5.

The process of reducing the chlorine content of the organochlorine compound is typically conducted between −50° C. and 300° C.; preferably 15° C. to 240° C.; most preferably the process is conducted at 140° C. to 220° C.

In another embodiment, the source of iodine or bromine employed in the reaction may be the effluent from the same or a different process. The effluent may be a gas or a liquid but is preferably a gas. For example, when effluent is removed from the reaction mixture of an organochlorine compound and a source of iodine or bromine, the effluent may contain at least some of the chlorine which has been liberated from the organochlorine compound, and unreacted bromine or iodine sources initially added to the reaction mixture and bromine or iodine compounds formed during the reaction such as hydrogen iodide and hydrogen bromide. The effluent containing the liberated chlorine compounds and various sources of iodine and bromine can be removed from the reaction mixture by blowing with a gas such as nitrogen, by maintaining the reaction mixture at an elevated temperature, by distillation, by stripping through the use of heat and/or vacuum, etc.

The effluent obtained in this manner can be conveniently recycled to the same or a different vessel used for treating organochlorine compounds in accordance with the process of the present invention. In this embodiment, the effluent which is recovered from a first process for recycling to a second process may be treated to remove one or more of the different chlorine compounds which may be contained in the effluent before the effluent is brought into contact with the second organochlorine compound. For example, the effluent from the first process may be treated to obtain a reduction of its chlorine content prior to contact with the second organochlorine compound. Chlorine compounds which may be removed from the effluent include hydrogen chloride, low molecular weight alkyl chlorides, chlorinated lower olefins, etc. The chlorine content of the effluent may be reduced by, for example, treating the effluent with caustic and/or by cooling the effluent to a temperature sufficient to liquify one or more of the chlorine compounds contained in the effluent and thereafter removing the liquified chlorine compounds.

In another embodiment, the effluent may be treated with an oxidant to convert any HI or HBr in the effluent to elemental iodine or elemental bromine before the effluent is used in a second process. For example, HI present in the effluent can be converted to elemental iodine by contacting the effluent with a peroxide in the presence of water or air in the presence of a transition metal such as Cu.

Accordingly, in one embodiment of the invention, an initial reaction vessel containing an organochlorine compound is treated with a source of iodine or bromine to reduce the chlorine content of the organochlorine compound. During or after this treatment, effluent is removed from the reaction mixture by any of the methods described above, and the effluent is recycled to the same vessel for further treatment of the organochlorine compound or may be recycled to a second reaction vessel containing an organochlorine compound to reduce the chlorine content of the organochlorine compound contained in the second reaction vessel. In this manner, the need for a fresh source of iodine or bromine is minimized or eliminated.

In one embodiment of the present invention, the effluent source of iodine or bromine from one reaction mixture is recycled to a second reaction vessel rather than being recycled to the same reaction vessel. In this embodiment, the source of iodine or bromine introduced into the second vessel may be the effluent from another reaction which may involve the same or a different organochlorine compound. Thus, the process of the invention for reducing the chlorine content of a second organochlorine compound may comprise (A) contacting the second organochlorine compound with a source of iodine or bromine or mixture thereof to form one or more different chlorine compounds wherein at least a portion of the source of iodine or bromine is obtained from the effluent of a first process to reduce the chlorine content of a first organochlorine compound wherein the first organochlorine compound is contacted with a source of iodine or bromine or a mixture thereof; and (B) separating at least one of the different chlorine compounds formed in (A) from the second organochlorine compound. Generally, the one or more different chlorine compounds formed in the process are more volatile than the organochlorine compound which facilitates the separation of the different chlorine compounds formed in the process from the organochlorine compounds. When the effluent of a first process is utilized as the source of iodine or bromine for treating a second organochlorine compound, the first organochlorine compound preferably is treated with elemental iodine or elemental bromine, or mixtures thereof. The different chlorine compounds contained in the effluent of the first process may be removed before the effluent is used in the second process.

As noted above, the organochlorine compound treated in the first process may be the same as or different from the organochlorine compound treated in the second process with the effluent of the first process. In some instances, it may be advantageous to utilize an organochlorine compound in the second process which is different from the organochlorine compound used in the first process. For example, a polyisobutenylsuccinic anhydride compound which contains chlorine may be treated with an initial source of iodine or bromine in accordance with the process of the invention, and the effluent obtained from this first process may then be utilized to lower the chlorine content of, for example, a polyisobutenyl chloride. Conducting the reactions on different organochlorine compounds may be advantageous depending upon the sensitivity of the organochlorine compounds to the type and/or amount of iodine or bromine or other by-products in the effluent. For example, it may be more effective to use the effluent of a first process for treating a second organochlorine compound rather than returning the effluent to the initial organochlorine reactor if the second organochlorine compound is more sensitive than the first organochlorine compound to the form of iodine or bromine contained in the effluent.

A list of chlorine containing compounds which can be treated in accordance with the process of this invention is far too numerous to name each and every compound. Moreover, simple experimentation under appropriate usage conditions will allow the technician to routinely practice the invention. The suggested exemplifications of handling various compounds to dechlorinate such materials is merely intended to be exemplary and some experimentation may be required to determine the appropriate conditions for conducting the dechlorination reaction. The organochlorine compounds treated herein include lubricating oil intermediates, typically those prepared according to the processes described in the Rense or Meinhardt patents incorporated by reference.

The organochlorine compounds which may be treated according to the present invention in order to reduce the chlorine content thereof may be chlorine-containing organic polymeric compounds and mixtures comprising chlorine containing organic polymeric compositions. In one embodiment the organochlorine compounds treated in accordance with the invention may be mixtures comprising a polyalkene-substituted succinic anhydride and chlorine which may be free and/or bonded chlorine such as polyalkenyl chloride, chlorinated polyalkenylsuccinic anhydride, chlorinated succinic anhydride, etc. In one preferred embodiment the organochlorine compounds are polyalkylene succinic anhydrides and in particular polyisobutenylsuccinic anhydride mixtures containing up to about 20% by weight of polyisobutene and small amounts of free and/or bonded chlorine. The polyalkylene succinic anhydrides are often referred to as substituted carboxylic or succinic acylating agents.

The substituted succinic acylating agents can be characterized by the presence within their structures of two groups or moieties. The first group is referred to hereinafter, for convenience, as the "substituent group" and is derived from a polyalkene. The polyalkenes from which the substituent groups are derived may be charactericed by an Mn (number average molecular weight) value of at least about 300. More often the Mn value is at least about 900, preferably at least about 1300 up to about 5000 or even 10,000. In other embodiments, the polyalkenes also can be characterized as having Mw/Mn values of from about 1.3 to about 4 or higher.

The second group or moiety of the acylating agent is referred to herein as the "succinic group(s)." The succinic group(s) should contain groups which can react with alcohols to form esters, ammonia or amines to form imides, amides or amine salts, or reactive metals or basically reactive metal compounds to form metal salts.

Procedures for preparing esters, amides, imides, amine salts and metal salts from carboxylic acylating agents are well known to those skilled in the art and are described in many patents. For example, reactions with hydroxy compounds to form esters are described in U.S. Pat. Nos. 3,331,776; 3,381,022; 3,522,179; and 3,542,680; reactions with amines to form amides, imides and amine salts are described in U.S. Pat. Nos. 3,172,892; 3,219,666; and 3,272,746; and reactions with reactive metals to form metal salts are described in U.S. Pat. Nos. 3,271,310; 3,306,908; and Re 26,433. All of these patents are expressly incorporated herein by reference.

A preferred organochlorine compound which may be treated according to the present invention in order to reduce the chlorine content thereof is a polyalkylenesuceinic anhydride and in particular a polyisobutenylsuccinic anhydride. The preferred compounds have a Mn value of about 1,300 to about 5,000 and an Mw/Mn value of about 1.5 to about 4. The acylating agent is further characterized by having within its structure at least 1.3 of the dibasic, carboxylic groups on the acylating agent for each equivalent weight of the groups derived from the polyalkylene (polyisobutylene). For the purpose of convenience, the disclosure of preferred organochlorine compounds which may be treated according to the present invention are found in U.S. Pat. No. 4,234,435 issued Nov. 18, 1980 to Meinhardt and Davis. The entire text of U.S. Pat. No. 4,234,435 is incorporated by reference.

The carboxylic acylating agents containing chlorine which can be treated in accordance with the process of the present invention include such agents prepared by known processes wherein a polyalkene is reacted with an unsaturated dicarboxylic acid or anhydride such as maleic acid or maleic anhydride. One method of preparing a succinic acylating agent is conveniently designated as the "two-step procedure" and is described in, for example, U.S. Pat. No. 3,219,666. It involves first chlorinating the polyalkene until there is an average of at least about one chloro group for each molecular weight of polyalkene. (For purposes of this invention, the molecular weight of the alkene is the weight corresponding to the Mn value.) Chlorination involves merely contacting the polyalkene with chlorine gas until the desired amount of chlorine is incorporated into the chlorinated polyalkene. Chlorination is generally carried out at temperatures of about 75° C. to about 125° C. If a diluent is used in the chlorination procedure, it should be one which is not itself readily subject to further chlorination. Poly- and perchlorinated and/or fluorinated alkyl benzenes are examples of suitable diluents.

The second step in the two-step chlorination procedure is to react the chlorinated polyalkene with the maleic reactant at a temperature usually within the range of about 100° C. to about 200° C. The mole ratio of chlorinated polyalkene to maleic reactant is usually about 1:1. (For purposes of making the two-step chlorinated product, a mole of chlorinated polyalkene is that weight of chlorinated polyalkene corresponding to the Mn value of the unchlorinated polyalkene.) However, a stoichiometric excess of maleic reactant can be used, for example, a mole ratio of 1:2.

If an average of more than about one chloro group per molecule of polyalkene is introduced during the chlorination step, then more than one mole of maleic reactant can react per molecule of chlorinated polyalkene. Because of such situations, it is better to describe the ratio of chlorinated polyalkene to maleic reactant in terms of equivalents. (An equivalent weight of chlorinated polyalkene, for the preparation of a two-step chlorinated product, is the weight corresponding to the Mn value divided by the average number of chloro groups per molecule of chlorinated polyalkene while the equivalent weight of the maleic reactant is its molecular weight.)

Thus, the ratio of chlorinated polyalkene to maleic reactant will normally be such as to provide about one equivalent of maleic reactant for each mole of chlorinated polyalkene up to about one equivalent of maleic reactant for each equivalent of chlorinated polyalkene with the understanding that it is normally desirable to provide an excess of maleic reactant; for example, an excess of about 5% to about 25% by weight. Unreacted excess maleic reactant may be stripped from the reaction product, usually under vacuum, or reacted during a further stage of the process as explained below.

The resulting polyalkenyl-substituted succinic acylating agent is, optionally, again chlorinated if the desired number of succinic groups are not present in the product. If there is present, at the time of this subsequent chlorination, any excess maleic reactant from the second step, the excess will react as additional chlorine is introduced during the subsequent chlorination. Otherwise, additional maleic reactant is introduced during and/or subsequent to the additional chlorination step. This technique can be repeated until the total number of succinic groups per equivalent weight of substituent groups reaches the desired level.

Another procedure for preparing substituted succinic acid acylating agents utilizes a process described in U.S. Pat. No. 3,912,764 and U.K. Patent No. 1,440,219, both of which are expressly incorporated herein by reference for their teachings in regard to that process. According to that process, the polyalkene and the maleic reactant are first reacted by heating them together in a "direct alkylation" procedure. When the direct alkylation step is completed, chlorine is introduced into the reaction mixture to promote reaction of the remaining unreacted maleic reactants. According to the patents, 0.3 to 2 or more moles of maleic anhydride are used in the reaction for each mole of olefin polymer; i.e. polyalkene. The direct alkylation step is conducted at temperatures of 180° C. to 250° C. During the chlorine-introducing stage; a temperature of 160° C. to 225° C. is employed. In utilizing this process to prepare the substituted succinic acylating agents useful herein, it would be necessary to use sufficient maleic reactant and chlorine to incorporate at least 1.3 succinic groups into the final product for each equivalent weight of groups derived from the polyalkene.

A further method of preparing a succinic acylating agent is disclosed in U.S. Pat. No. 3,231,587 issued Jan. 25, 1966 to Rense which is herein incorporated specifically by reference. This process, known as the "one step" process, and comprises preparing a mixture of an olefin polymer and maleic anhydride, and contacting said mixture at a temperature above about 140° C. with at least about one mole of chlorine for each mole of maleic anhydride. The product of the above process, as indicated before, is a hydrocarbon-substituted succinic anhydride, but it is not yet established whether the hydrocarbon radical is a saturated radical or one having olefinic linkages. The mechanism by which the product is formed is likewise not known. It is known, however, that the process is different from one in which the olefin polymer is first chlorinated and the chlorinated polymer is then allowed to react with maleic anhydride under similar reaction conditions. The two-step process requires a considerably lengthier reaction time and results in products which are much darker in color. Also, if the olefin polymer is to be chlorinated first, the chlorination temperature should not be allowed to exceed 120° C. Higher temperatures are known to cause dechlorination and thus result in products having little or no chlorine.

To carry out the process, it is preferred that the chlorine be introduced into the reaction zone after the olefin polymer has been thoroughly mixed with maleic anhydride. If the chlorine is allowed to come into contact with the olefin polymer prior to the introduction of maleic anhydride, chlorination of the polymer will take place and the advantageous results will not be obtained. The rate of introduction of the chlorine is not critical. Ordinarily, for maximum utlization of the chlorine used, the rate should be about the same as the rate of consumption of chlorine in this reaction.

The minimum temperature at which the reaction of the above process takes place at a reasonable rate is about 110° C.; hence, the minimum temperature at which the process should be carried out is in the neighborhood of 140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in the herein-described process requires approximately equimolar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect.

As indicated previously the process of this invention is applicable to the treatment of hydrocarbon substituted succinic anhydride derived from olefin polymers. The olefin polymers include principally the homopolymers and copolymers of lower mono-olefin, i.e., ethylene, propene, isobutene, and n-butene. Copolymers of the above-illustrated lower mono-olefins with copolymerizable higher mono-olefins or diolefins such as hexene, cyclohexene, butadiene, isoprene, chloroprene, etc. are likewise contemplated for use herein, provided that the lower mono-olefin units comprise at least 90–95% by weight of the polymer. The copolymers may be exemplified by copolymers of 99% of isobutene with 1% of butadiene, copolymers of 95% of isobutene with 5% of styrene, copolymers of 98% of propene with 2% of piperylene, terpolymers of 98% of isobutene with 1% of piperylene and 1% of propene, etc. For the most part, polymers of isobutene are preferred for reasons of their ready availability and the particular utility of the products obtained therefrom. The molecular weights of the polymers contemplated for use herein may vary within broad limits such as from about 100 to about 50,000 or even higher.

The reaction to reduce the chlorine content may appropriately be run under solvent free conditions or under conditions where no added solvent is employed. If a solvent is used then a hydrocarbon solvent such as a hydrocarbon oil, mineral oil, a polyalphaolefin, polyisobutylene, toluene, or xylene are commonly employed. In a preferred aspect of the invention where polyisobutenylsuccinic anhydride is treated with the source of iodine or bromine there will often be unreacted polyisobutylene from the acylation reaction. Thus in a preferred aspect the previously mentioned acylation reaction need not have the unreacted polyisobutylene removed. It is preferred that the solvent not be one containing oxygen moieties such as an aldehyde or ketone, and in particular acetone which is volatile, flammable and which must be removed from the reaction mixture. The solvent may be used in any useful amount such as in a weight ratio to the organochlorine of 0.01 to 250:1, conveniently. 0.05:1 to 25:1. The term solvent is used freely herein to include materials which are sufficient in small amounts to allow a reduction in viscosity to facilitate processing.

The time required to remove the chlorine from the organochlorine compound is conveniently 1 hour to 96 hours, often less than 24 or 48 hours. It is believed that the chlorine is removed from the organochlorine compound by the iodine or bromine or certain forms of iodine or bromine such as HI or HBr, and one or more different chlorine compounds or olefins are formed. For example, the different compounds may be one or more of the following: HCl, organic chloride (e.g., alkyl or alkylene chloride), isobutylene, etc. Generally these different compounds are more volatile than the organochlorine compound from which they are derived, and these more volatile compounds may volatilize and leave the reaction mixture during the reaction.

Removal of the different chlorine compounds is aided by gas flow through or over the mixture. Thus, the dechlorination process is facilitated by blowing a gas through the mixture of the source of iodine or bromine and the organochlorine compound. The gas utilized to aid in the process may be any gas substantially inert in the process such as nitrogen, carbon dioxide, or even steam, or the true inert gases such as argon or neon. Mixtures of gases such as a mixture of super heated steam and nitrogen also are useful. In one embodiment, the gas is not hydrogen.

In one preferred embodiment of the invention, the gas is not bubbled through the mixture of organochlorine compound and source of iodine or bromine until the source of iodine or bromine has been thoroughly blended into the organochlorine compound. If the source of bromine or iodine is not thoroughly blended into the organochlorine compound, the gas removes the source of bromine or iodine before it can be effective, and the overall reduction in chlorine is less than expected. Thus in one embodiment, the organochlorine compound is heated in a reactor to an elevated temperature such as 100–150° C. and the source of iodine or bromine is added to the reactor and blended into the organochlorine compound such as by stirring under closed conditions for 15 minutes to 2 hours or more. At this time, the gas (preferably nitrogen) is bubbled through the mixture in the reaction flask as the temperature is raised to about 200–220° C. Bubbling of the gas (preferably vigorous) is continued at this temperature for periods of from 3 or 6 hours up to 24 hours or more. Volatile chlorine products are formed and removed from the reaction vessel with the gas.

It also has been observed that the gas does not have to be bubbled through the mixture of organochlorine compound and iodine or bromine source. The chlorine compounds formed during the reaction can be removed by passing the gas vigorously over the stirred and heated mixture. In one preferred embodiment, the gas can be vigorously bubbled into a slip stream or side stream of the reaction mixture which may be forwarded to a holding tank, or which may be recirculated to the reaction vessel. Contact of the gas with the smaller quantity of reaction mixture in the slip stream or recirculation stream results in more rapid and effective removal of the chlorine compounds from the reaction mixture. In one variation of the invention, the gas is injected into the discharge of the pump on a recirculation line for the reaction vessel. The combination of improved mixing due to the turbulence in the line and a higher effective concentration of gas in the confined space of the line results in substantial improvement in the effectiveness of halogen and halide removal.

A further feature which may be utilized in the present invention is the presence of a proton source. It is believed that proton donors such as hydrogen chloride may aid in the dechlorination reaction or at least are not harmful to the reaction. In any event the presence of a proton (which may be generated in situ) may aid in removing the chlorine from the organochlorine compound. One possible mechanism for the removal of chlorine is that the chlorine in the organochlorine is converted to the corresponding hydrochloride which may be removed conveniently in the gaseous state.

The present invention contemplates the use of the products herein as intermediates for the manufacture of dispersants for lubricants, and in particular lubricants for four cycle engine crankcases. Such dispersants may be made by reaction with polyamines and/or polyols as described in U.S. Pat. No. 4,234,435 issued Nov. 18, 1980 to Meinhardt and Davis or U.S. Pat. No. 3,215,707 issued Nov. 2, 1965 to Rense both of which are incorporated herein by reference. U.S. Pat. No. 3,219,666 (Norman et al) also describes dispersants obtained by the reaction of polyamines with polyalkenylsuccinic anhydrides. The polyalkenylsuccinic anhydrides treated in accordance with the process of this invention can be substituted for the anhydrides described in the '666 patent. The products of the invention are also useful as intermediates for, and components, of two cycle oils and fuels including gasoline. The aminated products obtained herein are often used in concentrate or additive packages.

While a polyamine or a mixed polyamine ester product may be treated with the source of iodine or bromine to remove the halogen, such is not always desirable. That is, the process is most conveniently conducted on the acylating agent precursor for various reasons including cost and throughput considerations. Additional chlorine containing substrates which may be tested for efficacy of the present invention include chlorofluorocarbons, dioxin and polychlorinated biphenyl compounds.

In one embodiment, the mixtures utilized in the process of this invention comprising an organochlorine compound and a source of iodine or bromine are free of one or more of the following: hydrogen; hydrogenation catalysts; transition metals of Group 4 or 5 (IVa or Va) of the Periodic Table such as titanium, zirconium, vanadium, etc.; and hydridoborates.

The following include suggested exemplifications of the present invention.

EXAMPLE A

A material useful as a precursor for a dispersant in a motor oil is manufactured by forming a mixture of 1,000 parts (0.495 mole) of polyisobutene (Mn=2000; Mw=6400) and 106 parts (1.08 moles) of maleic anhydride which is heated to 110° C. This mixture is then heated to 138° C. and further heated to 190° C. over 6 hours during which 60 parts (0.85 moles) of gaseous chlorine is added beneath the surface.

At 184°–189° C. an additional 30 parts (0.42 mole) of chlorine is added over 4 hours. The reaction mixture is stripped by heating at 186°–190° C. with nitrogen blowing for 3 hours. The residue is the desired polyisobutene-substituted succinic acylating agent having a total acid number of 93. By analysis, the chlorine content of the above-identified product is about 0.72%.

EXAMPLE B

A polyisobutenylsuccinic anhydride product is prepared according to the Rense patent (U.S. Pat. No. 3,231,587) such that the reaction product contains one anhydride group for each equivalent weight of the groups derived from a polyisobutenyl precursor of the polyisobutenylsuccinic anhydride. By analysis, the chlorine content of the above-identified starting product is about 0.310%.

EXAMPLE C

The general procedure of Example A is repeated except that the 1000 parts of polyisobutene are reacted with 103 parts of maleic anhydride in the presence of 90 parts of chlorine. The polyisobutene succinic anhydride prepared in this manner contains 0.49% chlorine.

EXAMPLE D

A mixture of one mole of polypropylene (Mn=1000) and one mole of maleic anhydride is heated to an elevated temperature and a slight excess of gaseous chlorine is added beneath the surface over a period of about four hours. The reaction mixture is stirred by heating at about 190° C. with nitrogen blowing for about 24 hours. The residue is the desired polypropylene-substituted succinic anhydride. The chlorine content of this material is 0.63%.

EXAMPLE E

The general procedure of Example D is repeated except that the polypropylene is replaced by an equivalent amount of polyisobutylene having an Mn of 1000. The polyisobutenylsuccinic anhydride prepared in this manner has a chlorine content of 0.76.

EXAMPLE I

A product is prepared according to the procedure described in Example A.

The product prepared according to Example A is treated at 1% by weight with elemental iodine. The product is treated for a period of 6 hours at a temperature of 220° C. with nitrogen being blown through the product.

After completing the nitrogen blowing, the weight percent of chlorine in the product is observed to be 0.098%.

EXAMPLE II

A product is prepared according to Example A and treated with 1% elemental iodine by weight of the product of Example A with heating at 220° C. while blowing with nitrogen for 24 hours.

The observed chlorine content of the product following the 24 hour period is 0.024% by weight of the product.

EXAMPLE III

A product prepared according to Example A is treated at 190° C. for a period of 6 hours with nitrogen blowing through the product at 0.1 cubic foot per hour (2.83 l/hour) with 1.5% elemental iodine by weight of the product of Example A.

At the end of the 6 hour period the weight percent of chlorine in the reaction product is found to be 0.104%.

EXAMPLE IV

A product prepared according to Example A is treated at 190° C. for a period of 24 hours with nitrogen blowing through the product at 0.1 cubic foot per hour (2.83 l/hour) with 1.0% elemental iodine by weight of the product of Example A.

At the end of the 24 hour period the weight percent of chlorine in the reaction product is found to be 0.06%.

EXAMPLE V

A product prepared according to Example A is treated at 210° C. for a period of 15 hours with nitrogen blowing through the product at 0.1 cubic foot per hour (2.83 l/hour) with 0.5% elemental iodine.

At the end of the 24 hour period the weight percent of chlorine in the reaction product is found to be 0.056%.

This Example may be varied with substantially similar results by utilizing steam in place of the nitrogen.

EXAMPLE VI

A sample of a 1,000 number average molecular weight polyisobutenylchloride having a chlorine content of 4.74% by weight chlorine is heated to 190° C. and is blown with nitrogen throughout at 0.1 standard cubic foot per hour (2.83 l/hour).

The resultant mixture is then treated with 0.25% by weight elemental iodine based on the polyisobutenylchloride at 210° C. for six hours.

The resulting product shows a 90% drop in the chlorine level.

EXAMPLE VII

The process of Example I is repeated utilizing elemental bromine at the same percentage in place of the iodine. Substantially similar results are obtained to Example I.

EXAMPLE VIII

In Example I the level of iodine is reduced by 50% and replaced with an equivalent weight of bromine. Substantially similar results to Example I are observed.

EXAMPLE IX

The product prepared according to Example A at 6528 parts by weight is treated at 7.6 part by weight with 2-iodo-2-methylpropane as the source of iodine. The product is treated for a period of 6 hours at a temperature of 210° C. with nitrogen being blown through the product.

After completing the nitrogen blowing, the weight percent of chlorine in the product is observed to be 0.186%.

EXAMPLE X

A product is prepared according to the procedure described in Example A.

The product prepared according to Example A at 6040 parts by weight is treated with 19 parts by weight with iodochloride (ICl) as the source of iodine. The product is treated for a period of 6 hours at a temperature of 210° C. with nitrogen being blown through the product.

After completing the nitrogen blowing, the weight percent of chlorine in the product is observed to be 0.152%.

EXAMPLE XI

A product is prepared according to the procedure described in Example A.

The product prepared according to Example A at 490 parts is treated with 0.72 part by weight elemental iodine. The product is treated for a period of 6 hours at a temperature of 100° C. with nitrogen being blown through the product.

After completing the nitrogen blowing, the weight percent of chlorine in the product is observed to be 0.450%.

EXAMPLE XII

A product is prepared according to the procedure described in Example A.

The product prepared according to Example A at 600 parts is treated with 3 parts by weight elemental iodine. The product is treated for a period of 6 hours at a temperature of 210° C. with carbon dioxide being blown through the product.

After completing the nitrogen blowing, the weight percent of chlorine in the product is observed to be 0.118%.

EXAMPLE XIII

The product prepared according to Example B is treated at 500 parts with 1 part by weight elemental iodine. The product is treated for a period of 6 hours at a temperature of 190–200° C. with nitrogen being blown through the product.

After completing the nitrogen blowing, the weight percent of chlorine in the product is observed to be 0.160%.

EXAMPLE XIV

A product is prepared according to the procedure described in Example A.

The product prepared according to Example A at 2166 parts is treated with 2.2 parts by weight elemental iodine. The product is treated for a period of 2 hours at a temperature of about 90° C. with nitrogen being blown through the product at 0.283 l per hour (0.01 scfh).

After completing the nitrogen blowing, the weight percent of chlorine in the product is observed to be 0.516%.

EXAMPLE XV

A product is prepared according to the procedure described in Example A.

The product prepared according to Example A at 6022 parts is treated with 6 parts by weight elemental iodine. The product is treated for a period of 6 hours at a temperature of 190° C. with nitrogen being blown through the product.

After completing the nitrogen blowing, the weight percent of chlorine in the product is observed to be 0.315%.

EXAMPLE XVI

A product is prepared according to the procedure described in Example A.

The product prepared according to Example A at 6012 parts is treated with 12 parts by weight elemental iodine. The product is treated for a period of 6 hours at a temperature of 190° C. with nitrogen being blown through the product.

After completing the nitrogen blowing, the weight percent of chlorine in the product is observed to be 0.274%.

EXAMPLE XVII

A product is prepared according to the procedure described in Example A.

The product of Example A at 6000 parts is treated with 15 parts by weight of sodium iodide$\cdot$2H$_2$O. The product is treated for a period of 6 hours at a temperature of 212° C. with nitrogen being blown through the product.

After completing the nitrogen blowing, the weight percent of chlorine in the product is observed to be 0.233%.

EXAMPLE XVIII

A polyisobutenylsuccinic anhydride is prepared according to the general procedure of Example A, and the chlorine content of this anhydride is 0.49%. This anhydride (500 grams) is heated to 200° C. while blowing with nitrogen (0.2 scfh), and 0.25 gram of elemental iodine is added and the mixture is maintained at about 200° C. while stirring for 45 minutes with nitrogen blowing. Additional iodine (0.125 gram) is added and the mixture is stirred for an additional 45 minutes while the mixture is blown with nitrogen. The temperature of the reaction mixture is then raised to 210° C. and maintained at this temperature for 4.5 hours as nitrogen is bubbled through the mixture. Throughout the reaction, the vapors and nitrogen exiting the reaction flask (effluent) are used as the source of iodine in the reaction of Example XIX. The reaction mixture is cooled and recovered as product. The product is found to contain 0.111% chlorine and 0.036% iodine and has a total acid number of 91.6.

EXAMPLE XIX

Five-hundred grams of succinic anhydride of Example C are heated to 200° C., and the effluent (vapors carried by the nitrogen) from the reaction of Example XVIII is blown through the reaction mixture at 210° C. for six hours. At this time the reaction mixture is cooled and the residue is the desired product which contains 0.124% chlorine and 0.031% iodine and has a total acid number of 91.6.

EXAMPLE XX

Five-hundred grams of succinic anhydride of Example C are heated to 210° C., and nitrogen is blown through the anhydride. Iodine (1 gram) is added and the mixture is stirred and maintained at 210° C. for one hour while blowing with nitrogen. Additional iodine (1 gram) is added and the mixture is stirred and maintained at 210° C. for an additional hour. A final addition of iodine (1 gram) is made and the mixture maintained at 210° C. for 14 additional hours. The reaction mixture is then cooled and recovered as product. The product obtained in this manner contains 0.056% chlorine and 0.036% iodine and has a total acid number of 86.2.

EXAMPLE XXI

Five-hundred grams of succinic anhydride of Example C are heated to 210° C., and the gaseous effluent from the reaction of Example XX is bubbled through the succinic anhydride for 18 hours. The mixture is then cooled and recovered as the product which is found to contain 0.072% chlorine and 0.035% iodine, and the product has a total acid number of 87.2.

EXAMPLE XXII

Five-hundred grams of succinic anhydride of Example C are heated to 210° C. while blowing nitrogen through the anhydride. Iodine (2 grams) is added, and the mixture is maintained at 210° C. for 12 hours while blowing with nitrogen. The gas which is removed during this reaction (effluent) is used directly as the iodine source in the procedure of Example XXIII. The mixture is cooled and recovered as the product. The product contains 0.088% chlorine and 0.033% iodine.

EXAMPLE XXIII

Five-hundred grams of succinic anhydride of Example C are heated to 210° C., and 0.15 gram of iodine and the effluent (vapors) recovered from the process of Example XXII are passed through the mixture for 12 hours while maintaining the temperature of the mixture at 210° C. At the end of this time, the mixture is cooled and recovered as the product which is found to contain 0.103% chlorine and 0.031% iodine.

EXAMPLE XXIV

Five-hundred grams of succinic anhydride of Example C are heated to 210° C. while blowing with nitrogen, and 1.25 grams of iodine are added with stirring. After 45 minutes, an additional 1.25 grams of iodine are added and the mixture is maintained at 210° C. for 5 hours and 15 minutes while the reaction mixture is maintained at 210° C. with nitrogen blowing. The vapor which is removed from the reaction mixture is used as the iodine source in the process of Example XXV.

EXAMPLE XXV

Five-hundred grams of succinic anhydride of Example C are heated to 210° C., and the vapors emitted from the procedure of Example XXIV are allowed to pass through the succinic anhydride for six hours. The reaction mixture is cooled and recovered as product.

EXAMPLE XXVI

The product obtained in Example XXV (493 grams) is heated to 210° C. while blowing with nitrogen, and 1.25 grams of iodine is added. This mixture is maintained at 210° C. with stirring while blowing with nitrogen for 45 minutes, and an additional 1.25 grams of iodine are added. The reaction mixture is maintained at this temperature for 5.25 hours while blowing with nitrogen. (During this reaction, the volatile materials from this reaction (effluent) are used as the iodine source in the procedure of Example XXVII.) The mixture is cooled and recovered as the product which is found to contain 0.071% chlorine and 0.051% iodine.

EXAMPLE XXVII

Five-hundred parts of the succinic anhydride product of Example XXIV are heated to 210° C., and the effluent (volatiles) from the procedure of Example XXVI are allowed to pass through the mixture for six hours at this temperature. The reaction mixture is cooled and recovered as product which is found to contain 0.059% chlorine and 0.069% iodine.

EXAMPLE XXVIII

A reactor is charged with 1000 parts of a polyisobutenyl-succinic anhydride prepared as in Example A and containing 0.507% of chlorine. The succinic anhydride is heated to a temperature of about 150° C. at which time four parts of solid iodine beads are added and mixed with the succinic anhydride for one hour. The mixture then is heated to about 215° C. and maintained at this temperature for 24 hours while aggressively blowing with nitrogen to remove volatile materials. After 24 hours, the treated succinic anhydride is cooled to 150° C. and recovered as the product. The product obtained in this manner contains 0.046% of chlorine and 0.039% of iodine.

EXAMPLE XXIX

This is an example of a process wherein the effluent is recycled to the same reaction mixture. Two-hundred fifty grams of the succinic anhydride of Example C are heated to 210° C. Iodine (0.625 gram) is added and the mixture is blown with nitrogen at a rate of 0.2 scfh. After 45 minutes, the effluent from the reaction mixture which has been condensed in a dry ice condenser is returned to the reaction mixture. The condensed effluent is returned to the mixture every 45 minutes for three additional cycles. After an additional three hours at 210° C., the mixture is cooled and recovered as the desired product. The product contains 0.0128% chlorine and 0.028% iodine.

EXAMPLE XXX

A reactor is charged with 70 grams of polyisobutenylsuccinic anhydride prepared as in Example C and 0.176 gram of iodine. The reactor is closed and heated to 200° C. for 2 hours. The mixture then is cooled and a small amount of the pressure is released. A sample of the mixture in the reactor is analyzed and is found to contain 0.475% chlorine and 0.267% iodine. The chlorine content has not been reduced. The mixture recovered from the reactor is then heated to 200° C. in a round bottom flask with stirring. The mixture is blown with nitrogen. The mixture is maintained at this temperature and stirred for 6 hours while blowing with nitrogen. The mixture then is cooled and recovered as product. The product is found to contain 0.092% chlorine and 0.030% iodine.

EXAMPLE XXXI

A reactor is charged with 1000 grams of the polyisobutenylsuccinic anhydride prepared as in Example C, and 1.25 grams of iodine are added with stirring. After one hour of stirring, an additional 1.25 grams of iodine are added followed by stirring for an additional hour. The mixture then is heated to 210° C., and blown with nitrogen at 0.3 standard cubic feet per hour for 4 hours. The mixture is cooled and recovered as product. The product obtained in this matter contains 0.157% chlorine, 0.054% iodine.

EXAMPLE XXXII

A reactor is charged with 1000 grams of the polyisobutenylsuccinic anhydride prepared as in Example C, and the anhydride is heated to 190° C. while blowing with nitrogen. At this temperature, the nitrogen is discontinued, and 0.83 gram of iodine is added to the mixture with stirring. After a one-hour hold time, an additional 0.83 gram of iodine is added. The mixture is stirred for one hour and another 0.83 gram of iodine is added and this mixture is stirred for an additional hour. At this time, the temperature of the mixture is raised to 210° C., and nitrogen is bubbled through the mixture at 0.3 standard cubic feet per hour for three hours. The mixture then is cooled and recovered as product. The product prepared in this manner is found to contain 0.158% chlorine and 0.059% iodine.

EXAMPLE XXXIII

A reactor is charged with 250 parts of a polypropenyl-succinic anhydride prepared as in Example D, and the anhydride is heated to 150° C. and blown with nitrogen at 0.1 cubic foot per hour. At this temperature, 1.25 grams of iodine are added and the mixture is heated to 215° C. and maintained at this temperature while blowing with nitrogen for 24 hours. The mixture was cooled and recovered as product. The product obtained in this manner contains 0.160% chlorine and 0.180% iodine.

EXAMPLE XXXIV

A reactor is charged with 500 grams of a polyisobutenyl-succinic anhydride prepared as in Example E, and the anhydride is heated to 150° C. whereupon it is blown with nitrogen at 0.1 cubic foot per hour. Iodine (2.5 grams) is added, and the mixture is heated from 150° C. to 200° C. over a period of 0.5 hour. The mixture is maintained at 200° C. while blowing with nitrogen for an additional 24 hours. The mixture then is cooled and recovered as product. The product obtained in this manner contains 0.088% chlorine and 0.098% iodine.

EXAMPLE XXXV

A reactor is charged with 500 grams of a polyisobutenyl-succinic anhydride prepared as in Example E, and the anhydride is heated to 150° C. whereupon nitrogen is blown through the anhydride at a rate of 0.1 cubic foot per hour. Iodine (1.5 grams) then is added and the mixture is heated to 215° C. over 0.5 hour. The mixture is maintained at this temperature for 24 hours while blowing with nitrogen, and the mixture is recovered as product. The product obtained in this manner contains 0.080% chlorine and 0.061% iodine.

EXAMPLE XXXVI

The product of Example I is processed according to Example 10 of the Meinhardt patent (U.S. Pat. No. 4,234,435) to give an aminated dispersant useful in a lubricating oil.

EXAMPLE XXXVII

The product of Example II is processed according to Example 11 of the Meinhardt patent (U.S. Pat. No. 4,234,435) to give an aminated dispersant useful in a lubricating oil.

EXAMPLE XXXVIII

The product of Example III is processed according to Example 12 of the Meinhardt patent (U.S. Pat. No. 4,234,435) to give an aminated dispersant useful in a lubricating oil.

EXAMPLE XXXIX

The product of Example IV is processed according to Example 13 of the Meinhardt patent (U.S. Pat. No. 4,234,435) to give a product containing ester and amine functionality which is useful as a dispersant in a lubricating oil.

Similar products may be made per the Meinhardt patent (U.S. Pat. No. 4,234,435) to obtain esters from polyols such as pentaerythritol.

The above products may otherwise be further treated according to industry practices to obtain further useful products such as boronated dispersants.

The polyalkenyl-substituted succinic acids containing a reduced amount of chlorine can be used, as noted above, to prepare dispersants useful in lubricants, two-cycle oils, emulsions and fuels including gasoline. More particularly, the dispersants which may be prepared from the polyalicyl-substituted succinic anhydrides or acids prepared in accordance with the process of this invention and containing a reduced amount of chlorine may be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, etc. They can also be used in gas engines, stationary power engines and turbines and the like. Automatic or manual transmission fluids, transaxle lubricants, gear lubricants, including open and enclosed gear lubricants, tractor lubricants, metal-working lubricants, hydraulic fluids and other lubricating oil and grease compositions can also benefit from the incorporation therein of the dispersants discussed above. The dispersants may also be used in wire rope, wailing cam, way, rock drill, chain and conveyor belt, worm gear, bearing, and rail and flange lubricants.

Products such as those described above in Examples XXXVI to XXXIX may be used in lubricants or in concentrates, by themselves or in combination with any other known additives which include, but are not limited to other dispersants, detergents, antioxidants, anti-wear agents, extreme pressure agents, emulsifiers, demulsifiers, foam inhibitors, friction modifiers, anti-rust agents, corrosion inhibitors, viscosity improvers, pour point depressants, dyes, and solvents to improve handleability which may include alkyl and/or aryl hydrocarbons. These additives may be present in various amounts depending on the needs of the final product.

Other dispersants include, but are not limited to, Mannich dispersants and mixtures thereof as well as materials functioning both as dispersants and viscosity improvers. Mannich dispersants are prepared by reacting a hydroxy aromatic compound with an amine and aldehyde. The dispersants described above may be post-treated with reagents such as urea, thiourea, carbon disulfide, aldehydes, ketones, carboxylic acids, hydrocarbon-substituted succinic anhydride, nitriles, epoxides, boron compounds, phosphorus compounds and the like.

Detergents include, but are not limited to, Newtonian or non-Newtonian, neutral or basic salts of alkline earth or transition metals with one or more hydrocarbyl-substituted sulfonic, carboxylic, phosphoric, thiophosphoric, dithiophosphoric, phosphinic acid, or thiophosphinic acids, sulfur coupled phenol or hydrocarbon-substituted phenols. Basic salts are salts that contain a stoichiometric excess of metal present per acid function.

Auxiliary extreme pressure agents and corrosion- and oxidation-inhibiting agents which may be included in the lubricants of the invention are exemplified by chlorinated aliphatic hydrocarbons such as chlorinated olefins or wax; organic sulfides and polysulfides such as benzyl disulfide, bis(chlorobenzyl)disulfide, dibutyltetrasulfide, sulfurized methyl ester of oleic acid, sulfurized alkylphenol, sulfurized dipentene, and sulfuriced terpene; phosphosulfurized hydrocarbons such as the reaction product of a phosphorus sulfide with turpentine or methyl oleate, phosphorus esters including principally dihydrocarbyl and trihydrocarbyl phosphites such as dibutyl phosphite, diheptyl phosphite, dicyclohexyl phosphite, pentyl phenyl phosphite, dipentyl phenyl phosphite, tri-decyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; dithiocarbamate containing amides prepared from dithiocarbamic acid and an acrylamide (e.g., the reaction product of dibutylamine, carbon disulfide and acrylamide); alkylene-coupled dithiocarbamates (e.g., methylene or phenylene bis(dibutyldithiocarbamate)); and sulfur-coupled dithiocarbamates (e.g., bis(salkyldithiocarbamoyl)disulfides); metal thiocarbamates, such as zinc dioctyldithiocarbamate, and barium heptylphenyl dithiocarbamate; boron-containing compounds including borate esters; molybdenum compounds; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Viscosity improvers include, but are not limited to, polyisobutenes, polymethacrylate acid esters, polyacrylate acid esters, hydrogenated diene polymers, polyalkyl styrenes, hydrogenated alkenyl aryl conjugated diene copolymers, polyolefins and multifunctional viscosity improvers.

Pour point depressants are a particularly useful type of additive often included in the lubricating oils described herein. See, for example, page 8 of "Lubricant Additives" by C. V. Smalheer and R. Kennedy Smith (Lesius-Hiles Company Publishers, Cleveland, Ohio, 1967).

Anti-foam agents used to reduce or prevent the formation of stable foam include silicones or organic polymers. Examples of these and additional antifoam compositions are described in "Foam Control Agents," by Henry T. Kerner (Noyes Data Corporation, 1976), pages 125–162.

These and other additives are described in greater detail in U.S. Pat. No. 4,582,618 (Col. 14, line 52 through Col. 17, line 16, inclusive), herein incorporated by reference for its disclosure of other additives that may be used in combination with the present invention.

The concentrate might contain 0.01% to 90% by weight of the products of the invention. The dispersants may be present in a final product, blend or concentrate in a minor amount, i.e., up to 50% by weight or in any amount effective to act as a dispersants, but is preferably present in oil of lubricating viscosity, hydraulic oils, fuel oils, gear oils or automatic transmission fluids in an amount of from about 0.1% to about 10%.

The lubricating compositions and methods of this invention employ an oil of lubricating viscosity, including natural or synthetic lubricating oils and mixtures thereof. Natural oils include animal oils, vegetable oils, mineral lubricating oils, solvent or acid treated mineral oils, and oils derived from coal or shale. Synthetic lubricating oils include hydrocarbon oils, halo-substituted hydrocarbon oils, alkylene oxide polymers, esters of carboxylic acids and polyols, esters of polycarboxylic acids and alcohols, esters of phosphorus-containing acids, polymeric tetrahydrofurans, silicon-based oils and mixtures thereof.

Specific examples of the oils of lubricating viscosity are described in U.S. Pat. No. 4,326,972 and European Patent Publication 107,282, both herein incorporated by reference for their disclosures relating to lubricating oils. A basic, brief description of lubricant base oils appears in an article by D. V. Brock, "Lubricant Base Oils," *Lubricant Engineering*, Vol. 43, pages 184–185, March, 1987. This article is herein incorporated by reference for its disclosures relating to lubricating oils. A description of oils of lubricating viscosity occurs in U.S. Pat. No. 4,582,618 (Col. 2, line 37 through Col. 3, line 63, inclusive), herein incorporated by reference for its disclosure to oils of lubricating viscosity.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An organochlorine composition of matter having reduced chlorine content, said composition formed by the process comprising:

introducing to an organochlorine compound a non-salt source of iodine or bromine wherein the iodine or bromine to chlorine equivalent ratio from the chlorine in the organochlorine compound is about $1 \times 10^{-5}$:1 to 10:1 and contacting the resultant mixture for a sufficient amount of time and at a sufficient temperature while a gas is passed over the mixture or blown through at least a portion of the mixture to reduce the chlorine content of the organochlorine compound by at least 50% by weight while incorporating iodine or bromine into the organochlorine compound in an equivalent amount of 40% or less than the chlorine removed from the organochlorine compound.

2. A polyalkenylsuccinic anhydride composition having reduced chlorine content, said composition formed by the process comprising:

contacting a polyalkenylsuccinic anhydride having up to 10% by weight chlorine with a non-salt source of iodine or bromine to form a mixture wherein the iodine or bromine to chlorine equivalent ratio from the chlorine in the organochlorine compound is about $1 \times 10^{-5}$:1 to 10:1 for a sufficient amount of time and at a sufficient temperature to reduce the chlorine content of the polyalkenylsuccinic anhydride by at least 50% by weight incorporating iodine or bromine into the organochlorine compound in an equivalent amount of 40% or less than the chlorine removed from the organochlorine compound.

3. The reduced chlorine polyalkenylsuccinic anhydride of claim 2; wherein said anhydride is further reacted with a polyol.

4. The reduced chlorine polyalkenylsuccinic anhydride of claim 2; wherein said anhydride is further reacted with a polyamine.

5. The reduced chlorine polyalkenylsuccinic anhydride of claim 2; wherein said anhydride is further reacted with a polyamine and a polyol.

6. A polyalkenylsuccinic anhydride composition having reduced chlorine content, said composition formed by the process comprising:

(A) contacting a polyisobutenylsuccinic anhydride with, (B) a non-salt source of iodine or bromine, to form a mixture of (A) and (B) wherein the contacting is conducted between 15° C. and 240° C. and blowing the mixture with a gas, and provided further that the iodine or bromine to chlorine equivalent ratio from the chlorine in the polyisobutenylsuccinic anhydride is about $1 \times 10^{-5}$:1 to 10:1; wherein the chlorine content of said anhydride is reduced by at least 50% by weight, and said iodine or bromine is incorporated into said organochlorine component in an equivalent amount of 40% or less than the chlorine removed from the organochlorine compound.

7. Reduced chlorine composition according to claim 6, wherein said composition is further reacted with a polyamine, a polyol, or mixtures thereof.

8. A organochlorine composition having reduced chlorine content, said composition formed by the process comprising:

(A) contacting an organochlorine compound with a non-salt source of iodine or bromine or mixture thereof to form one or more different chlorine compounds and reducing the chlorine content of said organochlorine compound, wherein at least a portion of the source of iodine or bromine is obtained from the effluent of a first process for reducing the chlorine content of a first organochlorine compound wherein said first organochlorine compound is treated with a non-salt source of iodine or bromine, or mixtures thereof, and (B) separating at least some of the at least one of said different chlorine compounds formed in (A) from said organochlorine compound; wherein said organochlorine compound and said first organochlorine compound have 0.05–10% by weight chlorine, the iodine or bromine to chlorine equivalent ratio from the chlorine in said first organochlorine compound is about $1\times10^{-5}:1$ to 10:1, and wherein iodine or bromine is incorporated into said first organochlorine compound in an equivalent amount of 40% or less than the chlorine removed from said first organochlorine compound.

9. The organochlorine compound of claim 8, wherein at least one of said different chlorine compounds formed in (A) is separated from said organochlorine compound as a gas.

10. The organochlorine compound of claim 8, wherein said effluent of said first process is a gas comprising at least one of said different chlorine compounds and said source of iodine or bromine.

11. The organochlorine composition of claim 8, wherein said organochlorine compound is a mixture comprising polyisobutenylsuccinic anhydride and bonded chlorine.

12. The organochlorine composition of claim 8, wherein said organochlorine compound comprises a mixture of polyisobutenylsuccinic anhydride, polyisobutylene, and bonded chlorine.

13. The organochlorine composition of claim 8, wherein said source of iodine or bromine used to reduce the chlorine content of said organochlorine compound comprises a mixture of elemental iodine and the effluent of said first process.

14. A reaction product composition having reduced chlorine content, said reaction product comprising a polyisobutenylsuccinic anhydride prepared from a polyisobutylene and maleic anhydride in the presence of chlorine by a process comprising:

(A) contacting the reaction product containing chlorine with a non-salt source of iodine or bromine for a period of time sufficient to form one or more different chlorine compounds that are more volatile than the polyisobutenylsuccinic anhydride, wherein at least a portion of the source of iodine or bromine is obtained from the effluent of another process to reduce the chlorine content of an organochlorine compound wherein the organochlorine compound is treated with a source of iodine or bromine, or mixtures thereof, and (B) separating at least some of the at least one of the different chlorine compounds formed in (A) from the reaction product, wherein said reaction product and organochlorine compounds have 0.05–10% by weight chlorine, and wherein the chlorine content of the organochlorine compound is reduced by at least 50%, the iodine or bromine to chlorine equivalent ratio from the chlorine in the first organochlorine compound is about $1\times10^{-5}:1$ to 10:1, and wherein iodine or bromine is incorporated into the organochlorine compound in an equivalent amount of 40% or less than the chlorine removed from the organochlorine compound.

15. The reaction product composition of claim 14, wherein the polyisobutylene is characterized as having an Mn of from about 300 to about 10,000.

16. The reaction product composition of claim 14, wherein the polyisobutylene is characterized as having an Mn of from about 1300 to about 5000 and an Mw/Mn value of from about 1.5 to about 4.0, and the polyisobutenylsuccinic anhydride characterized as containing at least about 1.3 succinic groups per equivalent of polyisobutenyl group.

17. The reaction product composition of claim 14, wherein the product is reduced from a range of about 0.05% to 2% by weight to a range of from about 0.001% to about 0.2% by weight.

18. The reaction product composition of claim 14, wherein the reaction product is contacted with elemental iodine and the effluent from another process to reduce the chlorine content of another organochlorine compound.

19. The polyalkenylsuccinic anhydride composition according to claim 2 wherein a gas is blown over the mixture or through at least a portion of the mixture to reduce the chlorine content of an organochlorine compound.

20. The polyalkenylsuccinic anhydride composition according to claim 2 wherein the chlorine content of said polyalkenylsuccinic anhydride is reduced from 0.05% to 2% by weight to 0.001 to 0.2% by weight.

* * * * *